Figure 1:
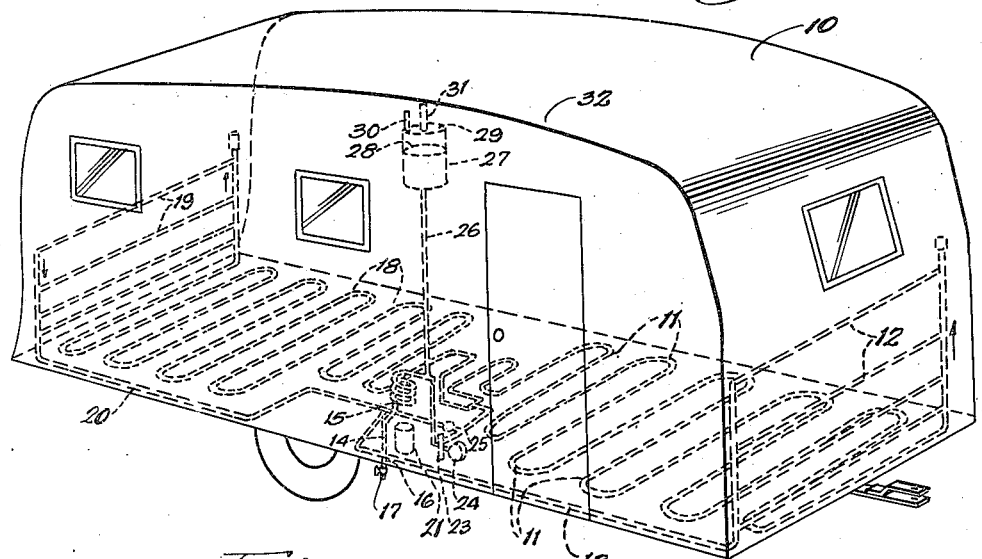

Oct. 4, 1949.  C. H. BECKER  2,483,721

HEATING VEHICLES AND THE LIKE

Filed June 14, 1946

Inventor:
Charles H. Becker,
By Dawson, Boothry Spangenberg,
Attorneys.

Patented Oct. 4, 1949

2,483,721

UNITED STATES PATENT OFFICE 2,483,721

HEATING VEHICLES AND THE LIKE

Charles H. Becker, Ironwood, Mich.

Application June 14, 1946, Serial No. 676,637

1 Claim. (Cl. 237—43)

This invention relates to heating vehicles and the like; it is particularly useful in connection with house trailer coaches, truck trailers, and automobiles.

The heating of a vehicle, such as a house trailer coach, truck trailer, automobile, etc., has presented a difficult problem for many years because such vehicles, unlike houses, have a large proportion of metal and glass surface through which radiation of heat takes place and because there is a relatively large proportion of the wall structure in the form of doors, windows, etc. Since the vehicle has to withstand heavy duty on the road and is subject to constant vibration, it cannot be formed into a structure as thoroughly insulated as a stationary building. To meet the problem, it has been customary to introduce large amounts of highly heated air into the compartment of the vehicle body so that, even with substantial loss of heat, there will still be a balance sufficient to keep the vehicle warm. The difficulty, however, with this system is that the portion of the air in the upper part of the compartment becomes excessively heated while the portion of the air in the bottom of the compartment is relatively cool. Further, the turbulence of the heating material tends to bring about a non-uniform heating of the vehicle body interior.

As a result of the difficulty involved in heating house trailer coaches, etc., I find that such coaches are used extensively only in warm sections of the country and in the northern sections of the country only during warm weather.

An object of the present invention is to provide a heating mechanism for a house trailer coach, truck trailer, or automobile, which will provide a uniformly-distributed heat through the interior of the structure and with the floor or lower portion of the vehicle fully as warm as the upper portion of the vehicle interior. Yet another object is to provide means for heating a house trailer coach, etc., so that it may be used in extremely cold climates with substantially the same amount of comfort as would be provided by a heated house. A further object is to provide a heating structure for an automobile wherein a low temperature heating liquid may be circulated for providing a uniform temperature within the vehicle body interior, while at the same time providing a structure which can withstand the vibration and shock of travel. A further object is to provide in such a structure, heating tubing which may be fairly widely distributed in combination with reflecting means which spreads and diffuses the heat uniformly through the floor or side wall panels of the vehicle body. Yet another object is to provide a heating structure which may be employed for effectively and uniformly heating a vehicle body through the use of a heating fluid, while at the same time permitting the fluid to be eliminated when the vehicle is to be drawn along rough sections of the country and still permitting the fluid to be quickly restored for heating when desired. Other specific objects and advantages will appear as the specification proceeds.

The invention is illustrated, in a preferred embodiment, by the accompanying drawing, in which—

Figure 2:
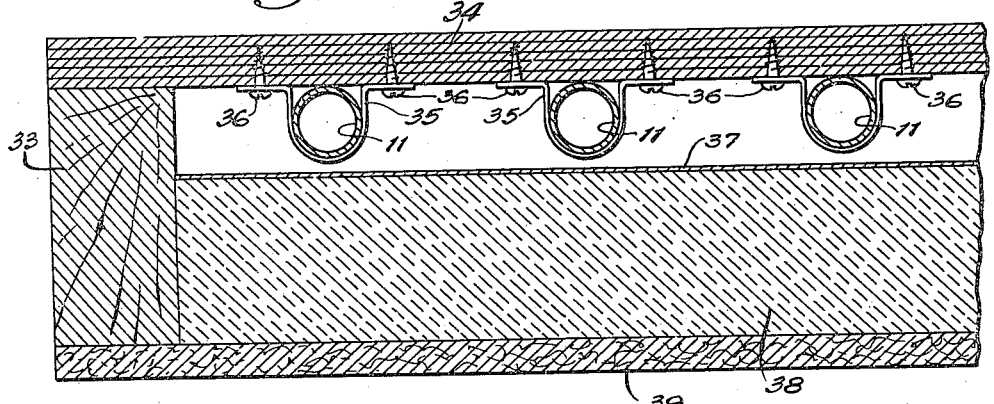
Figure 3:
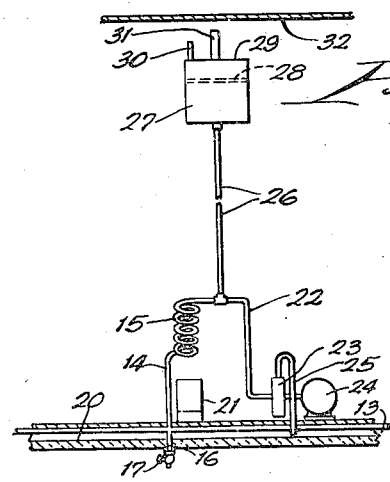

Figure 1 is a perspective view of a house trailer coach equipped with heating means embodying my invention; Fig. 2, a broken enlarged detail view showing a portion of the floor structure and the heating tubing applied thereto; and Fig. 3, a broken detail view in elevation of a portion of the heating and circulating system.

In the illustration given, 10 designates a trailer coach which may be of any suitable type of construction. It will be understood that the invention is applicable to other forms of trailers, such as truck trailers, and also to automobiles, etc., but for the purpose of illustration the house trailer coach 10 will be set out as an example.

Extending along the floor about one-half of the trailer area are coils of continuous tubing 11. A portion of the tubing 12 extends upwardly within the wall of one end of the trailer, and the return pipe 13 joins a pipe 14 leading to a heater coil 15. Connected to the pipe 15 is a downwardly-turned outlet pipe 16 equipped with a hand-controlled valve 17. A second series of coiled tubing 18 extends under the other half of the trailer floor, and a portion 19 may, if desired, be supported behind the vertical end wall of the trailer. A return pipe 20 joins the tube 14 leading into the heater coil. The heater 21 is positioned below the coil and may be supplied with any suitable fuel for heating the tubing and the liquid contained therein. It will be understood that the heat for the coil may be supplied by an electrical heater or by any fuel-burning structure.

Communicating with the coil 15 is a pipe 22 leading to a pump 23 driven by motor 24. The pump 23 delivers the heated fluid through the pipe 25 to the two coils 11 and 18. Also, communicating with the coil 15 is a riser 26 which extends to a regulation tank 27 filled with the heating fluid. Any suitable heating fluid may be used. For example, water or a non-freeze solution, such as Prestone, etc., may be employed, and a level of the liquid may be maintained below a perforated baffle 28. The top of the tank 27 may be closed at 29 and a small open pipe 30 provided for the escape of air. A pipe 31 may be extended from the tank 27 to any suitable point so as to serve as an inlet for filling the structure with liquid. While the refill pipe may extend at any position above the heating pipe system, I prefer to have it terminate below the top 32. It will be understood that the tank 27 may be located at any point within the vehicle and need not be supported near the top, as illustrated.

The floor of the house trailer coach may be formed in any suitable manner. For example, the frame may be formed of 2"x4" or 2"x2" timbers, etc., and over the frame may be secured any suitable flooring material. In the illustration given in Fig. 2, 33 indicates a 2" x 4" beam upon which rests plywood flooring 34. Between the beam 33 extends the usual cross-strips for providing the necessary supporting structure for the flooring. I prefer to secure the tubing directly to the bottom side of the flooring by straps and means securing the straps to the flooring. For example, straps 35 having perforated ends may be secured to the flooring by screws 36, or, if desired, a single strap may extend over a series of tubes and be secured at intervals to the flooring so as to lock the tubes firmly in place. Because of the vibration and shocks to which the tubing will be subjected, I prefer to employ seamless tubing, such as, for example, copper or copper alloy tubing, steel tubing, and other tubing which will withstand the vibrations, etc. A tubing formed of copper and the like is found to be highly satisfactory.

In order to reduce the amount of tubing required, while at the same time spreading the heat uniformly over the floor structure 34, I provide a reflector body or sheet 37 directly below the coils 11 (and 18). The reflector 37 may be formed of aluminum foil or other highly reflective material which will receive radiated heat from the coils 11 and then reflect this in a diverging arc toward the floor 34. Thus, the floor 34 receives not only the direct heat from the coils 11 and 18, but also receives along a more extensive area the reflected heat from the foil 37. Below the foil 37 and supporting the same is a mass of insulated material 38 which may be of any suitable material. For example, it may be formed of batting containing strips of paper, wood fibre, or any other suitable insulated material. The batting material is supported evenly below the tubes 11 by means of an asphalt board 39 which may be nailed or otherwise secured to the frame timbers. The board 39 may be formed of compressed fiber material saturated with asphalt, or, if desired, any suitable material for supporting the insulation 38 may be employed.

The end walls of the trailer may be provided with similar reflecting means and insulating means for preventing the escape of heat outside of the trailer and for directing the heat from the coils toward the interior of the trailer. In some instances, it will be found that the floor coils are sufficient for heating the vehicle and, therefore, the end wall coils may be omitted. It will be understood that, if desired, wall coils may be provided for the side walls as well as for the end walls of the trailer.

*Operation*

In the operation of the trailer, the heating coil system may be left free of liquid during that portion of the travel where no heat is required, thus relieving the tubing 11, 12, 18 and 19, etc. of the strain which is present where the coils are filled with water or other liquid. After a destination has been reached or after the trailer reaches cool country, the system may be filled with water, or other fluid through the pipe 31. The heater is then started for producing the desired amount of heat, and the motor 24 is set into operation for circulating the heating fluid. Because of the extensive area covered by the coils, it is found that a relatively low temperature is sufficient to maintain the interior of the coach at the desired temperature. For example, temperatures in the neighborhood of 80° are usually sufficient for maintaining the interior of the coach at a temperature of around 71° and 72°. For automatic control, the heater 15 will be provided with the usual aquastat, and the motor 24 will be provided with the usual thermostat control. The heater and the pump will thus be automatically operated to maintain the desired temperature set by these controls. Air formed in the system is allowed to escape through the regulation tank 27 and through air port 30. When the vehicle is traveling with the coils full of liquid, splashing of the liquid within tank 27 is prevented by the perforated baffle 28 and the closure 29 of the tank.

The generation of heat and the circulation of the heated liquid cause a transfer through the coils 11, 12, 18 and 19 directly to the flooring or wall structure, and, in addition, there is reflected by the foil 37, heat from three-fourths of the coil along a wide arc which strikes the flooring 34 and thus is diffused through the flooring. In this manner, the heat from the coils is widely spread and the floor becomes warm throughout its entirety. The interior of the trailer has a warm lower section and a warm upper portion and there is an absence of eddy currents. There is no stratification of heat layers within the compartment and no tendency for currents of air to be moving through the interior, producing different temperature conditions in different parts of the compartment.

It is normal practice, in traveling by trailer, for the occupants of the trailer to sit in the car which is pulling the trailer during a journey, and no heat is therefore required for the trailer. At such times, if desired, the valve 17 may be opened to drain the tubing of its content of liquid, and during such travel the relatively light tubing is supported firmly against the resilient flooring 34 of the coach. There is thus provided an extremely light vehicle and a light heating system while the trailer is in transit and an extremely efficient heating system, readily filled with liquid, for use when the trailer reaches its destination and is to be occupied. Normally, water provides a very satisfactory heating liquid and the supply may be easily replenished at any destination. In extremely cold areas, it may be desirable to use an anti-freeze solution of any suitable type.

The pump employed may be one driven by a 6-volt A. C.-D. C. motor connected to a storage battery and to a 110 to 6-volt transformer for 110-volt A. C. current. The motor may be equipped for being driven by the storage battery of the car, and it may also be equipped with means for plugging into a connection providing current from a municipal source.

The new system or mechanism for heating the house trailer coach eliminates cold floor drafts, while ceiling temperatures become comfortable, and the radiant heat reduces body perspiration. Further, heat losses through the ceiling and through the opening of doors is reduced because the differential between the heated interior of the coach and the exterior is reduced, the ceiling temperature being much less where thermal radiation of the type described is employed in contrast with currents of heated air forced into the coach.

The pipes, tubes, or ducts carrying the heated liquid and enclosed within the walls or floor may be arranged in a serpentine or grid arrangement or in any other desirable form which will permit a substantially even application to the desired floor or wall portions of the coach. The reflector sheet below the tubes receives the greater portion of the radiant energy from the tubes and diffuses this in a fan-shaped arc toward the floor, with the result that the floor is substantially uniformly heated throughout the surface served by the tube coils.

With the structure disclosed, access is readily available to the tubing upon the removal of the asphalt board 39. The removal of the board 39, with the layer of insulation and the reflector sheet 37 thereon, exposes the entire bottom portion of the floor with the tubes thereon for repair. Replacement of the board or boards 39 with the batting of insulation thereon requires a very brief time.

While in the foregoing specification I have set forth a specific structure showing one mode of application of the invention and in considerable detail, it will be understood that such details may be modified widely by those skilled in the art without departing from the spirit of my invention.

I claim:

In an automobile trailer coach having a closed wheel-equipped body and a floor, a continuous heating-fluid tubing extending below said floor along one-half the length thereof and disposed in parallel lengths extending transversely of said coach and connected by round bends, a similar tubing extending along the other half of said floor, a motor-driven pump supported in said coach intermediate said sets of tubing and communicating therewith for supplying heating fluid through each set of tubing, and reflector sheet material supported in said coach below said tubing.

CHARLES H. BECKER.

REFERENCES CITED

The following references are of record in the file of this patent:

UNITED STATES PATENTS

| Number | Name | Date |
|---|---|---|
| 186,739 | Linsley | Jan. 30, 1877 |
| 354,640 | Johnson et al. | Dec. 21, 1886 |
| 538,184 | Searle | Apr. 23, 1895 |
| 2,265,536 | McFarlane | Dec. 9, 1941 |

FOREIGN PATENTS

| Number | Country | Date |
|---|---|---|
| 192,321 | Switzerland | Dec. 1, 1937 |
| 278,195 | Great Britain | Oct. 6, 1927 |
| 540,678 | Great Britain | Oct. 27, 1941 |